United States Patent Office
3,211,561
Patented Oct. 12, 1965

3,211,561
DIESTER PLASTICIZERS
William M. Gearhart and Paul T. Von Bramer, Kingsport, Tenn., assignors to Eastman Kodak Company, Rochester, N.Y., a corporation of New Jersey
No Drawing. Filed Nov. 15, 1961, Ser. No. 152,609
8 Claims. (Cl. 106—180)

This invention relates to novel plastic compositions and more particularly to compositions plasticized with certain diesters of 2,2,4-trimethylpentane-1,3-diol.

The invention is based on our discovery that diesters of aliphatic, monocarboxylic acids and the glycol half-ester, 3-hydroxy-2,2,4-trimethylpentyl isobutyrate have unexpected advantages as plasticizers for a number of different types of polymers, including vinyl and acrylic resins and cellulose esters and ethers useful as molding compositions, lacquers and protective coatings, films, etc. We have found that such diesters are compatible with a wide range of such polymers either as primary or as secondary plasticizers. In this use the subject diesters have shown unexpected advantages in properties such as heat stability, hydrolytic stability, resistance to extraction by oil, water or soapy water, resistance to staining, compatibility with other components and other valuable properties.

The glycol half-ester, 3-hydroxy-2,2,4-trimethylpentyl isobutyrate or 2,2,4-trimethylpentane-1,3-diol monoisobutyrate as it is also called (abbreviated hereinafter as TMPD-MI), is described in the literature. See for instance the reports of the compound and of its preparation by the Tischenko condensation of three molecules of isobutyraldehyde in the presence of a catalyst such as an alkali metal alkoxide: Tischenko et al., Chem. Zentr., 1906, II, 1552–1556; Kulpinski and Nord, J. Org. Chem., 8, 256 (1943).

The diester plasticizers used in our novel compositions can be prepared by esterifying 3-hydroxy-2,2,4-trimethylpentyl isobutyrate with the selected monocarboxylic acid by known procedures for esterifying hydroxyl compounds with carboxylic acids in accordance with the following equation:

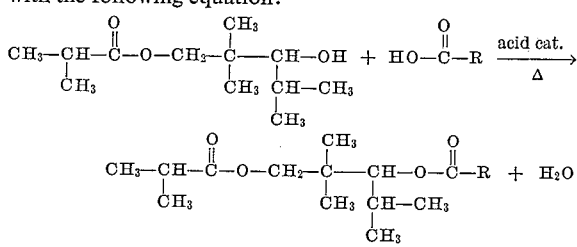

wherein R is an alkyl, alkenyl or epoxidized alkenyl radical or residue of a monocarboxylic acid of about 2 to 20 carbon atoms.

For example, a mixture of approximately equimolar proportions of the monocarboxylic acid and the glycol half-ester containing a minor amount of an esterification catalyst and a volatile liquid that forms an azeotrope with water is heated at reflux temperature for several hours. The water of reaction is continuously removed as an azeotrope and the desired diester is recovered from the organic reaction mixture. Although the different possible esterification catalysts that can be used for preparing the diesters are not necessarily equivalents in their results, various esterification catalysts can be used such as hydrochloric acid, sulfuric acid, p-toluenesulfonic acid, etc. Metallic esterification catalysts can also be used. These include organo-metallic compounds of titanium, tin and the like as well as the sulfates, halides and hydroxides thereof.

The esterification of TMPD-MI with a selected fatty acid or a mixture of fatty acids is the preferred method of preparing the diester plasticizers. However, a preferred diester, the diisobutyrate of 2,2,4-trimethylpentane-1,3-diol, which we will refer to hereinafter as the diisobutyrate or as TMPD-DI, can also be obtained by the procedure of Tischenko and Grigorjew, Chem. Zentr., 1906, II, 1555–6, wherein isobutyraldehyde is condensed in the presence of magnesium amalgam to yield a mixture of products including the glycol half-ester and the diisobutyrate.

The acids from which the diester plasticizers are prepared are saturated or unsaturated, straight or branched-chain monocarboxylic acids or fatty acids. Examples of suitable acids include aliphatic monocarboxylic acids having from 2 to about 20 carbon atoms per molecule. Preferred acids include such acids as acetic, propionic, butyric, isobutyric, 3-methylbutyric, hexanoic, 2,2-dimethylhexanoic, 2,2,4 - trimethylpentanoic, 2,3,4 - trimethylpentanoic, 2,2-dimethyloctanoic, stearic, oleic and linoleic. The diesters can be prepared from a single acid or from a mixture thereof. An example of a suitable mixture of acids is the fatty acid fraction of tall oil. Suitable mixtures of this type are available commercially which contain about 98 to 99 weight percent fatty acids of which about 95 percent are unsaturated acids such as oleic and linoleic, the fatty acids being in the $C_{16}$ to $C_{20}$ range. Other suitable mixtures of similar fatty acid content have lower unsaturated content, but above about 70 percent.

Especially preferred acids for preparing the diesters are isobutyric acid and tall oil fatty acid mixtures of the type mentioned. The diester prepared from the tall oil fatty acid mixture, which diester will be referred to hereinafter as the "tallate," is preferably epoxidized before being used as a plasticizer. This can be accomplished by conventional epoxidation procedures, employing an epoxidizing reagent such as peracetic acid, monoperacetate, perbenzoic acid or the like and converting all vinylene groups (—CH:CH—) of the unsaturated acyl groups of the diester to epoxy or oxirane groups

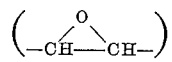

thus forming acyl groups containing one or two of such epoxy groups. As we will show more fully hereinafter, the diisobutyrate and the tallate-isobutyrate diesters have outstanding advantages as plasticizers for vinyl resins and cellulose esters.

The various diesters of the class that we have described have somewhat different properties and some are more suitable for a particular use than others. In general, however, they are quite versatile as plasticizers for one or more types of polymers such as vinyl acetate polymer, vinyl alcohol polymer, vinyl chloride polymer, vinyl chloride-acetate copolymer, vinylidene chloride polymer, vinyl formal polymer, ethyl cellulose, cellulose acetate, cellulose propionate, cellulose acetatebutyrate, cellulose nitrate, methyl methacrylate polymer, polystyrene, phenolic resins, etc. Some of the diesters are valuable as primary plasticizers. Others, having more limited compatibility with certain polymers, are more valuable as secondary plasticizers.

An especially preferred diester for the compositions of our invention is the diester obtainable by esterifying 3-hydroxy-2,2,4-trimethylpentyl isobutyrate with isobutyric acid, and being of the formula:

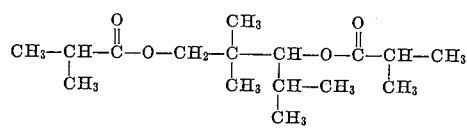

The above diisobutyrate is especially useful as a low cost, low color plasticizer for vinyl resins. We use the terms "vinyl," "vinyl resin" and "vinyl polymer" in the usual generic sense to include the various vinyl polymers and copolymers, such as vinyl chloride, vinyl acetate, vinyl chloride-acetate, vinylidene chloride, vinyl formal, vinyl butyral, vinyl alcohol polymers and the like.

The diisobutyrate can be used as a primary plasticizer for vinyl polymers used in the manufacture of toys, floor tile, and other low cost vinyl products. In such uses the plasticizer exhibits excellent hydrolytic stability. Its low freezing point and low viscosity contribute to ease of handling. It is very compatible with vinyl resins and functions as a primary plasticizer as well as in combination with secondary plasticizers.

Typical properties of the diisobutyrate which can be prepared by esterifying 3-hydroxy-2,2,4-trimethylpentyl isobutyrate with isobutyric acid are given in Table I:

TABLE I
*Physical properties of diisobutyrate of 2,2,4-trimethylpentane-1,3-diol*

| | |
|---|---|
| Color, APHA, p.p.m. | 10 |
| Specific gravity, 20°/20° C. | 0.9444 |
| Molecular weight | 287 |
| Saponification equivalent | 144.8 |
| Boiling point, 760 mm., ° C. | 280 |
| Pounds per gallon, 20° C. | 7.88 |
| Refractive index, $n_D^{25°\,C.}$ | 1.4300 |
| Boiling water stability, percent hydrolyzed after 96 hours | 0.024 |
| Flash point, Cleveland open cup, ° F. | 250 |
| Freezing point, ° F. | −94 |

TMPD diisobutyrate is very compatible with vinyl resins and functions as a primary plasticizer as well as in combination with secondary plasticizers. It is easily milled into vinyl resins. The minimum mill temperature for the diisobutyrate is about 270° F. which is lower than the temperatures normally used with other plasticizers. Table II lists the properties of two milled vinyl compositions, one plasticized with the diisobutyrate in accordance with our invention and the other plasticized with a higher-priced conventional plasticizer, dioctyl phthalate (abbreviated hereinafter as "DOP"). Table II shows that such properties as low temperature flexibility, hardness and tensile properties of our resin composition are generally at least equivalent to those of the composition containing the more expensive DOP. Further, the table shows that our composition is superior in resistance to oil and heptane extraction.

TABLE II
*Properties of milled vinyl compositions*

| Formulation | ASTM Method | Parts by Wt. | |
|---|---|---|---|
| Resin: Vinyl Chloride Polymer (Geon 101) | | 100 | 100 |
| Stabilizers: | | | |
| Barium-Cadmium | | 2 | 2 |
| Epoxy | | 2 | 2 |
| Plasticizer: | | | |
| TMPD Diisobutyrate | | 50 | |
| DOP | | | 50 |
| Properties: | | | |
| Tensile Strength, p.s.i. | D638 | 3,100 | 2,850 |
| 100% Modulus, p.s.i. | D638 | 1,850 | 1,500 |
| Ultimate Elongation, percent | D638 | 300 | 400 |
| Elongation Retention, percent | | 0 | 20 |
| Tear Resistance, p.p.i. | D1004 | 460 | 380 |
| Shore "A" Durometer Hardness, 5 sec. | D1706 | 86 | 83 |
| Soapy Water Ext. (1% soln.) loss, percent | D1239 | 2.6 | 0.5 |
| Oil Extraction loss, percent | D1239 | | 24 |
| Heptane Extraction loss, percent | D1239 | 8.6 | 24 |
| Activated Carbon Extraction: | | | |
| Loss, percent | D1203 | 12 | 1.5 |
| Thickness, mils | | 8.0 | 10 |
| Torsion Modulus, ° C.: | | | |
| 35,000 p.s.i. | D1043 | −20 | −25 |
| 135,000 p.s.i. | D1043 | −47 | −49 |
| Accelerated Weathering: | | | |
| Hand | D795 | 2/1 | 0/0 |
| Color | D795 | 2/0 | 1/0 |
| Exudation | D795 | 0/0 | 1/0 |

TMPD diisobutyrate is also an excellent plasticizer for vinyl floor tile compositions. It readily wets the clay filler used in such compositions and can be compounded into formulations containing a high amount of filler such as calcium carbonate or clay-filler. This is a property of extreme importance in the floor tile art.

Vinyl floor tile plasticized with the diisobuytrate shows better resistance to staining after exposure to common household chemicals than similar tile plasticized with DOP or with butyl benzyl phthalate. In tests that we have conducted, floor tile samples containing the diisobutyrate showed no signs of exudation or tackiness even after being waxed with a commercial acrylic floor wax and aged at slightly elevated temperatures.

Tables III and IV show typical properties of vinyl floor tiles plasticized with TMPD diisobutyrate and other plasticizers.

TABLE III
*Properties of filled poly(vinyl chloride) containing TMPD diisobutyrate*

| Formulation | ASTM Method | Parts by Weight | | | |
|---|---|---|---|---|---|
| | | A | B | C | D |
| Resin: Poly(Vinyl Chloride) (Geon 101 EP) | | 100 | 100 | 100 | 100 |
| Filler: Clay-type filler | | 200 | 200 | 200 | 200 |
| Stabilizers: | | | | | |
| Cadmium | | 2 | 2 | 2 | 2 |
| Epoxy | | 2 | 2 | 2 | 2 |
| Plasticizer: | | | | | |
| TMPD Diisobutyrate | | | 50 | 15 | 35 |
| DOP | | 50 | | 35 | 15 |
| Total Parts of Plasticizer, PHR. | | 50 | 50 | 50 | 50 |
| Properties: | | | | | |
| Soapy Water Ext. (1% soln.) loss, percent | D1239 | 0.7 | 0.5 | 0.4 | 0.7 |
| Oil Extraction loss, percent | D1239 | 0.8 | 1.5 | 1.0 | 0.7 |
| Heptane Extraction loss | D1239 | 14 | 5.3 | 12 | 6.4 |
| Activated Carbon Extraction: | | | | | |
| Loss, percent | D1203 | 1.8 | 1.4 | 2.7 | 2.1 |
| Thickness, mils | | 14 | 14 | 14 | 14 |
| Accelerated Weathering: | | | | | |
| Hand | D795 | OK | OK | OK | OK |
| Color | D795 | 1/0 | 1/0 | 3/0 | 2/0 |
| Exudation | D795 | 0/0 | 0/0 | 0/0 | 0/0 |

PHR=Parts by weight of designated ingredient per 100 parts of resin.

TABLE IV
*Staining and exudation characteristics of vinyl floor tile [1] plasticized with TMPD diisobutyrate*

| Plasticizer | Stain Test [2] | | | | Acrylic Wax Test [3] |
|---|---|---|---|---|---|
| | Lipstick | Mustard | Ink | Avg. | |
| TMPD Diisobutyrate, 50 PHR | 1 | 3 | 2 | 2 | No exudation. |
| TMPD Diisobutyrate, 35 PHR and DOP, 15 PHR | 5 | 4 | 1 | 3 | Do. |
| TMPD Diisotubyrate, 15 PHR and DOP, 35 PHR | 6 | 5 | 4 | 5 | Do. |
| DOP, 50 PHR | 4 | 6 | 5 | 5 | Slight exudation. |
| Butyl Benzyl Phthalate 50 PHR | 3 | 2 | 6 | 4 | Exudation. |

[1] Formulation:
Poly(vinyl chloride), 100 PHR.
Plasticizer, 50 PHR.
Filler, clay, 200 PHR.
Stabilizer, 4 PHR.
[2] Rolled and pressed floor tile samples were stained with lipstick, mustard, and ball point pen ink, placed in a 50° C. oven for 24 hours, washed with water (acetone for ink samples) to remove as much stain as possible. The samples were visually rated (1=best, 6=worst) according to the amount of stain remaining.
[3] Other floor tile samples were waxed with commercial acrylic floor waxes, placed in 100° F. oven for 24 hours and observed for exudation.

We have also prepared plastisol compositions plasticized with TMPD diisobutyrate. It is useful as a plasticizer for plastisol compositions that contain an inorganic filler and for those that do not. Using TMPD diisobutyrate as a primary plasticizer, we can prepare plastisols having very low initial viscosity and good viscosity stability. We can also use the diisobutyrate as a supplementary or modifying plasticizer to obtain low viscosity and increased flexibility. Because of its high compatibility with vinyl resin, TMPD diisobutyrate can be compounded into plastisols containing high amounts of filler without exceeding required viscosity limits. The mechanical properties of diisobutyrate-modified plastisol films are generally equivalent to those DOP-modified film. As with the calendered films, TMPD diisobutyrate shows better resistance to oil and heptane extractions. The diisobutyrate-modified plastisol films also show a higher degree of resiliency than the DOP-modified films. These general properties of filled and unfilled plastisols plasticized with TMPD diisobutyrate are demonstrated in Table V which follows.

TABLE V

*Properties of poly(vinyl chloride) plastisols containing TMPD diisobutyrate*

| Formulation | ASTM Method | Parts by Weight | | |
|---|---|---|---|---|
| Resin: Poly(vinyl chloride) | | 100 | 100 | 100 |
| Filler: Calcium Carbonate | | | 50 | |
| Stabilizers: | | | | |
| Barium-Cadmium | | 2 | 2 | 2 |
| Epoxy | | 2 | 2 | 2 |
| Plasticizer: | | | | |
| TMPD Diisobutyrate | | 75 | 75 | |
| DOP | | | | 75 |
| Properties: | | | | |
| Tensile Strength, p.s.i. | D638 | 2,200 | 1,750 | 2,150 |
| 100% Modulus, p.s.i. | D638 | 840 | 610 | 720 |
| Ultimate Elongation, percent | D638 | 420 | 290 | 440 |
| Tear Resistance, p.p.i. | D1004 | 175 | 140 | 210 |
| Shore "A" Durometer Hardness 5 sec. | D1706 | 70 | 68 | 67 |
| Soapy Water Ext. (1% soln.) loss, percent. | D1239 | 4.1 | 4.0 | 1.0 |
| Oil Extraction loss, percent | D1239 | 4.5 | 3.3 | 24 |
| Heptane Extraction loss, percent | D1239 | 15 | 13 | 31 |
| Activated Carbon Extraction loss, percent. | D1203 | 23 | 20 | 2.4 |
| Torsion Modulus, ° C: | | | | |
| 35,000 p.s.i. | D1043 | −38 | −46 | −46 |
| 135,000 p.s.i. | D1043 | −56 | −63 | >−60 |
| Accelerated Weathering: | | | | |
| Hand | D795 | 2/0 | 2/0 | 0/0 |
| Color | D795 | 4/0 | 4/0 | 1/0 |
| Exudation | D795 | 0/0 | 0/0 | 0/0 |
| Viscosity, cps. (Brookfield, No. 4 spindle, 6 r.p.m., 23° C.) after aging: | | | | |
| 1 day | | | 440 | 3,900 | 3,700 |
| 7 days | | | 560 | 3,600 | 4,000 |
| 14 days | | | 560 | 3,800 | 4,500 |
| Yield value (14 days) | | | 7.2 | 140 | 48 |

The aliphatic, monocarboxylic acid esters of TMPD-MI are also useful as plasticizers for various film formers in surface coatings. For example, TMPD diisobutyrate as a plasticizer for cellulose nitrate films produces film properties comparable to those imparted by the conventional plasticizer, dibutyl phthalate, but at a lower cost.

TMPD diisobutyrate can be used as a plasticizer for various lacquer compositions. Typical lacquer compositions in accordance with the invention comprise: (a) a base resin or polymer such as cellulose nitrate, cellulose acetate-butyrate, ethyl cellulose, acrylic resin, mixtures of cellulose acetate-butyrate with acrylic resin, etc.; (b) TMPD diisobutyrate in a plasticizing amount, e.g. 5–50 weight percent based on the non-volatile base polymer (the particular amount of plasticizer being dependent on whether a hard or soft lacquer film is desired); and (c) a volatile organic solvent such as an alcohol, ester, ketone, aromatic hydrocarbon or a mixture of such solvents, in an amount, e.g., of 50 to 90 volume percent of the total lacquer formulation. Of course, other additives desirable for lacquer compositions can also be included.

The effectiveness of TMPD diisobutyrate as a plasticizer for cellulose ester and acrylic lacquers has been demonstrated by evaluations of film hardness, tensile strength and percent elongation of film of such lacquers. Nitrocellulose solutions in ethyl acetate and acrylic resin (Acryloid A–21—a product of Rohm & Haas Company) solutions in toluene were prepared for the tests. For Sward hardness tests the solutions contained 0, 15, 30, 45 and 60 percent plasticizer based on the non-volatile. Films were cast from these solutions on glass plates at 7 mils wet thickness. The films were air-dried 60 hours, then dried 2 hours at 150° F. The Sward hardness values for the celulose nitrate films containing TMPD as plasticizer were very close to those for the films containing di-(2-ethylhexyl) phthalate or dibutyl phthalate as plasticizer. In the case the acrylic films, the films containing TMPD diisobutyrate were somewhat harder than those containing the other plasticizers. Greater than 45% plasticization (on non-volatile) was required to produce a tacky acrylic film with TMPD diisobutyrate, while other plasticizers produced tackiness at or below 45%.

For the tensile strength and elongation tests cellulose nitrate (½ sec.) and acrylic (Acryloid A–21) solutions were prepared with 30% plasticizer based on non-volatile. Ten mil (wet) acrylic films and 20 mil (wet) nitrocellulose films were cast on glass plates and dried for 60 hours at room temperature. Test samples were cut and tensile strength and percent elongation were determined on an Instron tester. The results show that with nitrocellulose film TMPD-DI is as good as or better than di-(2-ethylhexyl) phthalate in retention of tensile strength of the base polymer and about equivalent in improving elongation. In the acrylic film tests TMPD diisobutyrate proved to be substantially better than butyl benzyl phthalate with respect to tensile strength, though not so good wih respect to elongation.

Cold-check resistance tests on cellulose nitrate wood lacquer films plasticized with TMPD diisobuytrate have also demonstrated its value. Films of such lacquer cast on glass plates, dried and conditioned and then subjected to repeated cold-check cycles. One cycle consisted of exposure for one hour at 120° F. followed by one hour at −6° F. The coating containing TMPD diisobutyrate passed four cycles before any checking occurred. A similar lacquer plasticized with the more expensive dibutyl phthalate also cracked after four cycles. Both coatings showed the same amount of film-checking after an extended number of cycles.

The volatility or retention properties of TMPD diisobutyrate in nitrocellulose films are comparable with that of dibutyl phthalate as shown by volatility tests of a lacquer composition in accordance with the invention of the following formulations.

| Component: | Wt. percent |
|---|---|
| Half-second nitrocellulose (100%) | 16 |
| TMPD diisobutyrate | 4 |
| Toluene | 28 |
| n-Butyl alcohol | 18.4 |
| Isobutyl acetate | 17.2 |
| Ethyl acetate | 16.4 |
| | 100.0 |

Small samples of the above lacquer were weighed into aluminum dishes and air-dried for one week to evaporate the solvent. The lacquer films were then heated at 120° F.

for 14 days with periodic weighings. After 14 days the drying was increased to 220° F. Decreases in film weight were considered to result from plasticizer loss by volatilization. The results show that after 14 days at 120° F. the loss in the lacquer containing TMPD diisobutyrate was 3.8% as compared with 4.0% for a similar lacquer containing dibutyl phthalate. In the subsequent period at 220° F. both showed a loss of 20% after 20 hours. In other words the results with the cellulose nitrate lacquer containing TMPD diisobutyrate as the plasticizer were entirely comparable with the results for the lacquer containing the more expensive plasticizer.

We have indicated that the monocarboxylic acid esters of TMPD-MI are compatible as plasticizers with many different polymers, although they are, of course, more compatible with some than with others. Taking TMPD diisobutyrate as an example, it is compatible or only slightly incompatible with a range of thermoplastic and thermosetting plastics including acrylic resins, phenolic resins, cellulose acetate-butyrate, ethylcellulose, nonoxidizing alkyd resin, oxidizing alkyd resin, cellulose nitrate, nitrile rubber, polystyrene, poly(vinyl chloride), poly(vinyl acetate), poly(vinyl butyral), and epoxy resins.

We have employed TMPD-MI tallate and epoxy tallate as plasticizers for various compositions. One example of the tallate was prepared by esterifying 3-hydroxy-2,2,4-trimethylpentyl isobutyrate with a commercial fatty acid fraction of tall oil known as Sylfat 496, a product of Glidden Paint Company. The latter material is a mixture comprising about 97.8% weight percent fatty acids having from 16 to 20 carbon atoms per molecule, at least about 70% of such fatty acids being unsaturated acids, about 60% being oleic acid. The esterification product is essentially a mixture of compounds that can be represented by the structure:

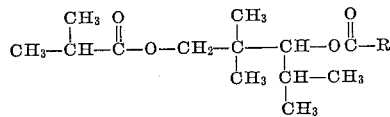

where R is the residue of a fatty acid having from 16 to 20 carbon atoms per molecule, at least about 60 percent of the mixture being compounds in which R is the alkenyl residue of oleic acid.

The above mentioned TMPD-MI tallate may be prepared according to the following procedure:

Tall oil fatty acid (Sylfat 496) and TMPD-MI (10–25% excess of theoretical) are added to a flask which is fitted with stirrer, thermometer, and Dean-Stark trap with attached reflux condenser. Stirring is started and the temperature is raised to 200±5° C. and maintained there during the course of the reaction. The water of reaction is removed from the Dean-tark trap as it is formed. The reaction is allowed to proceed until an acid number of 5 or less is reached.

The crude ester is washed with sodium hydroxide solution to neutralize the remaining free acid and then washed neutral by water. The excess TMPD-MI is removed by distillation at reduced pressure.

We have prepared TMPD-MI epoxy tallate by epoxidizing TMPD-MI tallate prepared from $C_{16}$–$C_{20}$ tall oil fatty acids as described above, as follows:

TMPD-MI tallate and sodium acetate (an amount needed to buffer the sulfuric acid in peracetic acid solution) are added to a flask fitted with stirrer, thermometer, addition funnel, and reflux condenser. The TMPD-MI tallate is cooled to 20° C. by an ice bath and 40% peracetic acid solution (a small excess over the theoretical amount as determined by iodine number of TMPD-MI tallate) is added dropwise with stirring. The temperature is maintained at 20–25° C. during the addition, and for 3 hours after all of the peracetic acid has been added. The temperature is then raised to 50–60° C. and maintained at this point for 1–2 hours.

The ester is transferred to a separatory funnel and washed acid-free by warm water. Finally, the material is further purified by warming at reduced pressure.

By the above epoxidation procedure we obtain TMPD-MI epoxy tallate which is essentially a mixture of compounds that can be represented by the above general structure where R is the residue of a $C_{16}$–$C_{20}$ epoxy or diepoxy fatty acid, the major part of the mixture being compounds in which R is the residue of epoxy or diepoxy stearic acid.

TMPD-MI tallate is an excellent secondary plasticizer for milled vinyl plastisols. When employed with DOP as a primary plasticizer, it lowers the cost of the formulation and improves the permanence and low temperature properties as compared with the vinyl resin plasticized solely with DOP. The TMPD-MI epoxy tallate is an excellent epoxy type plasticizer for vinyl formulations and imparts excellent heat stability properties.

Table VI below lists physical properties of TMPD-MI tallate and TMPD-MI epoxy tallate prepared as described above.

TABLE VI

|  | TMPD-MI Tallate | TMPD-MI Epoxy Tallate |
|---|---|---|
| Specific Gravity, 20°/20° C | 0.9131 |  |
| Molecular Weight (B.P. rise) | 480 (theor.) | 503 (theor.) |
| Saponification Equivalent | 253.1 |  |
| Heat Test (2 hr. at 205° C.) percent acid | 0.064 |  |
| Boiling Point, 760 mm., ° C | 356 |  |
| Refractive Index, $n_D^{25°C}$ | 1.4588 | 1.4600 |
| Boiling Water Stability, percent hydrolyzed after 96 hr | 0 |  |
| Flash Point, Cleveland Open Cup, ° F | 468 |  |
| Freezing point, ° F | −62 |  |
| Acid Number |  | 0.2 |

Table VII demonstrates various physical properties of TMPD-MI tallate and TMPD-MI epoxy tallate in milled vinyl formulations.

TABLE VII

| Formulation | ASTM method | Parts by Weight | | |
|---|---|---|---|---|
| Resin: Poly(Vinyl Chloride) (Geon 101 EP) |  | 100 | 100 | 100 |
| Stabilizers: |  |  |  |  |
| Cadmium |  | 2 | 2 | 2 |
| Epoxy |  | 2 |  |  |
| Plasticizers: |  |  |  |  |
| DOP |  | 25 | 50 | 50 |
| TMPD-MI Tallate |  | 25 |  |  |
| TMPD-MI Epoxy Tallate |  |  | 10 |  |
| Epoxidized Soy Bean Oil |  |  |  | 10 |
| Properties: |  |  |  |  |
| Tensile Strength, p.s.i | D638 | 2,950 | 2,500 | 2,600 |
| 100% Modulus, p.s.i | D638 | 1,850 | 1,250 | 1,250 |
| Ultimate Elongation, percent | D638 | 345 | 355 | 390 |
| Tear Resistance, p.p.i | D1004 | 405 | 310 | 320 |
| Shore "A" Durometer Hardness, 5 sec. | D1706 | 91 | 74 | 87 |
| Soapy Water Ext. (1% soln.) loss, percent | D1239 | 0.4 | 0.3 | 0.3 |
| Heptane Extraction loss, percent | D1239 | 25 | 28 | 26 |
| Activated Carbon Extraction: |  |  |  |  |
| Loss, percent | D1203 | 0.3 | 1.0 | 0.9 |
| Thickness, mils |  | 14 | 12 | 13 |
| Torsion Modulus, ° C.: |  |  |  |  |
| 35,000 p.s.i | D1043 | −30 | −32 | −32 |
| 135,000 p.s.i | D1043 | <−60 | −59 | −59 |
| Accelerated Weathering: |  |  |  |  |
| Hand | D795 | 1/0 | 1/0 | 1/0 |
| Color | D795 | 2/1 | 1/0 | 1/0 |
| Exudation | D795 | 4/0 | 3/0 | 0/0 |

Table VIII provides data on vinyl plastisols containing TMPD-MI tallate or TMPD-MI epoxy tallate.

TABLE VIII

| Formulation | ASTM Method | Parts by Weight | | |
|---|---|---|---|---|
| Resin: Poly (Vinyl Chloride) (Geon 121) | | 100 | 100 | 100 |
| Stabilizers: | | | | |
|   Barium-Cadmium | | 2 | 2 | 2 |
|   Epoxy | | 2 | | 2 |
| Plasticizers: | | | | |
|   TMPD-MI Tallate | | 25 | | |
|   TMPD-MI Epoxy Tallate | | | 25 | |
|   DOP | | 75 | 75 | 100 |
| Properties: | | | | |
|   Tensile Strength, p.s.i | D638 | 1,650 | 1,700 | 1,600 |
|   100% Modulus, p.s.i | D638 | 575 | 530 | 535 |
|   Ultimate Elongation, percent | D638 | 430 | 455 | 455 |
|   Tear Resistance, p.p.i | D1004 | 125 | 155 | 145 |
|   Shore "A" Durometer Hardness, 5 sec. | D1706 | 55 | 54 | 55 |
|   Soapy Water Ext. (1% soln.) loss, percent. | D1239 | 0.9 | 1.5 | 0.6 |
|   Heptane Extraction loss, percent. | D1239 | 44.0 | 45 | 42.5 |
|   Activated Carbon Extraction loss, percent. | D1203 | 2.2 | 2.0 | 2.8 |
|   Torsion Modulus, ° C.: | | | | |
|     35,000 p.s.i | D1043 | −59 | −54 | −53 |
|     135,000 p.s.i | D1043 | <−60 | <−60 | <−60 |
|   Accelerated Weathering: | | | | |
|     Hand | D795 | 0/0 | 0/0 | 0/0 |
|     Color | D795 | 1/0 | 0/0 | 1/0 |
|     Exudation | D795 | 4/0 | 1/0 | 4/0 |
|   Viscosity, cps. (Brookfield, No. spindle, 6 r.p.m., 23° C.) after aging: | | | | |
|     1 day | | 1,400 | 2,900 | 2,200 |
|     7 days | | 1,350 | 2,900 | 3,200 |
|     14 days | | 1,400 | 2,800 | 3,000 |
|     Yield value (14 days) | | 12 | 36 | 36 |

Table IX demonstrates the stabilizing effect of TMPD-MI epoxy tallate in vinyl plastisols and shows that it compares favorably with a commercially available epoxidized soy bean oil which is widely used for this purpose.

TABLE IX

*Stabilizing effect of epoxy plasticizers in poly(vinyl chloride) plastisols*

| Plasticizer | Oxirane Oxygen of Epoxy, Percent | Color Change on Over-aging at 177° C. | | | |
|---|---|---|---|---|---|
| | | 30 min. | 60 min. | 90 min. | 120 min. |
| 75/25 DOP/TMPD-MI Epoxy Tallate | 3.6 | Sl. yellow | Sl. yellow | Med. yellow | Amber. |
| 82.5/17.5 DOP/TMPD-MI Epoxy Tallate. | 3.6 | do | Light yellow | Light amber | Amber. |
| 75/25 DOP/Epoxidized Soy Bean Oil | 6.2 | do | Sl. yellow | Med. yellow | Yellow. |
| 100 PHR DOP | | Brown | Black | Black | Black. |

Formulation:
  Poly(Vinyl Chloride) (Geon 121), 100 parts.
  Plasticizer, PHR as indicated.
  Barium-Cadmium Stabilizer, 2 parts.

The physical compounding of the various plasticized compositions in accordance with the invention can be performed by known procedures. For instance, the vinyl resin compositions can be compounded by the use of conventional equipment such as mills of the heated roll type or internal mixers. The plasticizer and other compounding ingredients such as fillers and stabilizers are worked into the vinyl resin so that they are thoroughly dispersed and the resultant composition is then molded, calendered, extruded, cast or otherwise formed into articles of the desired shape. Procedures followed in preparing test samples of milled vinyl and plastisol compositions described in the foregoing tables illustrate methods of compounding plasticized compositions in accordance with the invention. Standard procedures followed in preparing such test samples are described hereinafter.

PLASTISOL

Formulation:
  Poly(vinyl chloride) resin _____ 100 parts.
  Barium-cadmium stabilizer _____ [1] 2 phr.
  Epoxy stabilizer _____ [1] 2 phr.
  Plasticizer _____ As indicated.

[1] Parts per hundred parts of resin.

The plasticizer and stabilizers are added slowly to the resin in a Hobart mixer which is operating at the slowest speed. Blending is continued until a smooth paste is formed. Entrapped air is removed from the paste by vacuum. Films, 70 mils thick for mechanical property tests and 10 mils thick for extraction tests, are cast on glass plates and cured at approximately 191° C. in a forced-draft oven. The films are considered cured when maximum clarity is obtained, usually after 10–15 min. for the thick films and 6–8 minutes for the thin films. The films are conditioned for 48 hours at 23° C. and 50% relative humidity before testing.

MILLED PLASTIC

Formulation:
  Poly(vinyl chloride) resin _____ 100 parts.
  Barium-cadmium stabilizer _____ 2 phr.
  Epoxy stabilizer _____ 2 phr.
  Plasticizer _____ As indicated.

The resin, plasticizers and stabilizers are blended thoroughly. The blend is then milled on a 2-roll mill for 4–7 minutes at approximately 163° C. Sheets approximately 70 mils thick for mechanical property tests are prepared according to the following procedure: The milled plastic is preheated in the press for 1.5 minutes at 177° C., pressed for 1 minute at 177° C., and cooled under pressure for 4.5 minutes. Sheets approximately 10 mils thick for extraction tests are prepared on a 3-roll calender mill. All sheets are conditioned for 48 hours at 23° C. and 50% relative humidity before testing.

We have illustrated compositions in accordance with the invention in which the amount of diester plasticizer incorporated with the base polymer varies over a considerable range. In general, the plasticizer should be present in an amount sufficient to improve the flexibility of the base resin or polymer and can vary from about 20 to 150 parts by weight per hundred parts by weight of resin. Preferably, the proportion of plasticizer is from about 40 to 100 parts by weight per hundred parts of resin. The total amount of plasticizer within these ranges of proportion can comprise one or more diesters of TMPD or a mixture of such a diester with one or more other types of plasticizers such as dioctyl phthalate, dibutyl phthalate, tricresyl phosphate and the like.

The invention has been described in considerable detail with particular reference to certain preferred embodiments thereof, but it will be understood that variations and modifications can be effected within the spirit and scope of the invention as described hereinabove, and as defined in the appended claims.

We claim:

1. A plasticized composition comprising a polymeric plastic from the group consisting of vinyl resins and cellulose esters and an amount sufficient to improve the flexibility of said plastic of 2,2,4-trimethylpentane-1,3-diol diisobutyrate.

2. A plasticized composition comprising poly(vinyl chloride) resin and a plasticizing amount of 2,2,4-trimethylpentane-1,3-diol diisobutyrate.

3. A floor tile composition comprising a poly(vinyl chloride) resin, an inorganic filler and a plasticizing amount of 2,2,4-trimethylpentane-1,3-diol diisobutyrate.

4. A lacquer composition comprising a minor amount of cellulose nitrate, a plasticizing amount of 2,2,4-trimethylpentane-1,3-diol diisobutyrate and a volatile organic lacquer solvent.

5. A plasticized composition comprising a poly(vinyl chloride) resin and an amount sufficient to improve the flexibility of said resin of a primary and a secondary plasticizer, said secondary plasticizer being an ester of 3-hydroxy-2,2,4-trimethylpentyl isobutyrate with a mixture of tall oil fatty acids of 16 to 20 carbon atoms.

6. A plasticized composition comprising a poly(vinyl chloride) resin and an amount sufficient to improve the flexibility of said resin of a primary and a secondary plasticizer, said secondary plasticizer being an epoxidized ester of 3-hydroxy-2,2,4-trimethylpentyl isobutyrate with a mixture of tall oil fatty acids of 16 to 20 carbon atoms.

7. A plasticized composition comprising a polymeric plastic substance and a plasticizing amount of a diester of the formula:

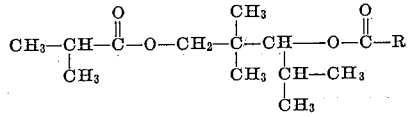

wherein R is alkyl, alkenyl or epoxidized alkenyl residue of a monocarboxylic acid of 2 to 20 carbon atoms.

8. A plastisol composition comprising a poly(vinyl chloride) resin and an amount of 2,2,4-trimethylpentane-1,3-diol diisobutyrate sufficient to form a plastisol with said resin.

References Cited by the Examiner
UNITED STATES PATENTS

| | | | |
|---|---|---|---|
| 2,592,234 | 4/52 | Bell | 260—488 |
| 2,625,563 | 1/53 | Bell | 260—488 |
| 2,757,157 | 7/56 | Hetzel | 260—31.6 |
| 2,766,145 | 10/56 | Jones | 131—17 |
| 3,038,907 | 6/62 | McConnell et al. | 260—30.4 |

OTHER REFERENCES

Tischenko et al.: Chem. Zentr., 1906, II, 1555–6.

MORRIS LIEBMAN, *Primary Examiner.*

LEON J. BERCOVITZ, *Examiner.*